(12) United States Patent
Islam et al.

(10) Patent No.: US 12,227,704 B2
(45) Date of Patent: Feb. 18, 2025

(54) PROCESSES FOR PRODUCING PETROCHEMICAL PRODUCTS FROM CRUDE OIL

(71) Applicant: Saudi Arabian Oil Company, Dhahran (SA)

(72) Inventors: Md Ashraful Islam, Dhahran (SA); Gopal Juttu, Dhahran (SA); Abdennour Bourane, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 106 days.

(21) Appl. No.: 18/052,308

(22) Filed: Nov. 3, 2022

(65) Prior Publication Data
US 2024/0150663 A1    May 9, 2024

(51) Int. Cl.
*C10G 51/06*    (2006.01)

(52) U.S. Cl.
CPC ..... *C10G 51/06* (2013.01); *C10G 2300/1033* (2013.01); *C10G 2300/4006* (2013.01); *C10G 2300/4012* (2013.01); *C10G 2400/20* (2013.01)

(58) Field of Classification Search
None
See application file for complete search history.

(56) References Cited

U.S. PATENT DOCUMENTS 3,053,752 A    9/1962 Swanson
3,894,934 A    7/1975 Owen et al.
(Continued)

FOREIGN PATENT DOCUMENTS

CN    1265937 A  *  9/2000
CN    101210191 A    7/2008
WO    2018222338 A1    12/2018

OTHER PUBLICATIONS

Machine translation CN 1265937. retrieved Apr. 10, 2024 (Year: 2024).*
Notification of Transmittal of the International Search Report and the Written Opinion of the International Searching Authority, or the Declaration dated Feb. 6, 2024 pertaining to International application No. PCT/US2023/077728 filed Oct. 25, 2023, pp. 1-15.
(Continued)

*Primary Examiner* — Youngsul Jeong
*Assistant Examiner* — Alyssa L Cepluch
(74) *Attorney, Agent, or Firm* — DINSMORE & SHOHL LLP

(57) ABSTRACT

Processes for producing products from crude oil include separating the crude oil into at least a lesser boiling point fraction and a greater boiling point fraction and passing the fractions to a reactor system that includes a riser section and a downer section. An outer boundary of the downer section is defined by a first wall in a plane perpendicular to a central axis, and outer boundaries of the riser section are defined by the first wall and a second wall in the plane perpendicular to the central axis. In an alternate arrangement, an outer boundary of the riser section is defined by a first wall in a plane perpendicular to a central axis, and outer boundaries of the downer section are defined by the first wall and a second wall in the plane perpendicular to the central axis. The process includes cracking the lesser boiling point fraction in the riser section in the presence of a catalyst and cracking the greater boiling point fraction in the downer reactor in the presence of the catalyst. The process includes passing the catalyst from the riser to the downer, from the downer to a regenerator, and from the regenerator to the riser.

11 Claims, 3 Drawing Sheets

(56) References Cited

U.S. PATENT DOCUMENTS

| | | |
|---|---|---|
| 4,419,221 A | 12/1983 | Castagnos, Jr. et al. |
| 5,009,769 A | 4/1991 | Goelzer |
| 5,372,704 A | 12/1994 | Harandi et al. |
| 5,730,859 A | 3/1998 | Johnson et al. |
| 5,904,837 A | 5/1999 | Fujiyama |
| 5,951,850 A | 9/1999 | Ino et al. |
| 6,287,522 B1 | 9/2001 | Lomas |
| 6,656,346 B2 | 12/2003 | Ino et al. |
| 7,491,315 B2 | 2/2009 | Eng et al. |
| 7,906,077 B2 | 3/2011 | Sandacz |
| 8,877,042 B2 | 11/2014 | Dean et al. |
| 9,290,705 B2 | 3/2016 | Bourane et al. |
| 9,434,892 B2 | 9/2016 | Pradeep et al. |
| 9,458,394 B2 | 10/2016 | Dean et al. |
| 10,273,417 B2 | 4/2019 | Sadhullah et al. |
| 2017/0107430 A1 | 4/2017 | Koseoglu |
| 2019/0161686 A1* | 5/2019 | Bell ............... B01J 8/1872 |

OTHER PUBLICATIONS

Akah et al., "Maximizing propylene production via FCC technology" Appl. Petrochem Res, vol. 5, pp. 377-392, 2015.

Akah et al., "Reactivity of naphtha fractions for ligh olefins production", Int. J. Ind. Chem, vol. 8, pp. 221-133, 2017.

Corma et al., "Different process schemes for converting light straight run and fluid catalytic cracking naphthas in a FCC unit for maximum propylene production", Applied Catalysis A: General, vol. 265, pp. 195-206, 2004.

Liu et al., "Study on the FCC Process of a Novel Riser-Downer Coupling Reactor (III): Industrial Trial and CFD Modeling", Ind. Eng. Chem. Res., vol. 47, pp. 8582-8587, 2008.

Verstraete et al., "Study of direct and indirect naphtha recycling to a resid FCC unit for maximum propylene production", Catalysis Todya, vol. 106, pp. 62-71, 2005.

\* cited by examiner

PROCESSES FOR PRODUCING PETROCHEMICAL PRODUCTS FROM CRUDE OIL

TECHNICAL FIELD

Embodiments of the present disclosure generally relate to chemical processing and, more specifically, to process for producing petrochemical products from crude oil.

BACKGROUND

Ethylene, propene, butene, butadiene, and aromatics compounds such as benzene, toluene and xylenes are basic intermediates for a large proportion of the petrochemical industry. They are usually obtained through the thermal cracking (or steam pyrolysis) of petroleum gases and distillates such as naphtha, kerosene, or even gas oil. These compounds are also produced through refinery fluidized catalytic cracking (FCC) processes where classical heavy feedstocks such as gas oils or residues are converted. Typical FCC feedstocks range from hydrocracked bottoms to heavy feed fractions such as vacuum gas oil and atmospheric residue; however, these feedstocks are limited. The second most important source for propene production is currently refinery propene from FCC reactor units. With the ever-growing demand, FCC reactor unit owners look increasingly to the petrochemicals market to boost their revenues by taking advantage of economic opportunities that arise in the market.

The worldwide increasing demand for light olefins remains a major challenge for many integrated refineries. In particular, the production of some valuable light olefins such as ethylene, propene, and butene has attracted increased attention as pure olefin streams are considered the building blocks for polymer synthesis. The production of light olefins depends on several process variables like the feed type, operating conditions, and the type of catalyst.

SUMMARY

Embodiments of the present disclosure are directed to improved reactor systems for processing crude oil to produce light olefins. According to embodiments disclosed herein, crude oil can be separated into at least two fractions, and each fraction can be cracked in a reactor system as disclosed. Embodiments of reactor systems described herein may include a riser section and a downer section, where either the riser section is generally arranged around the downer section or the downer section is generally arranged around the riser section, as described in greater detail herein. The riser section and downer section may have a shared wall. Such arrangement of the riser and downer sections of the reactor system may decrease heat lost from the reactor system and may decrease the overall footprint of the reactor system, relative to conventional reactor systems.

According to one or more embodiments described herein, a process for producing petrochemical products from crude oil comprises separating the crude oil into at least a lesser boiling point fraction and a greater boiling point fraction and passing the lesser boiling point fraction and the greater boiling point fraction to a reactor system. The reactor system comprises a first substantially prism-shaped wall arranged around a central axis, the central axis oriented in a substantially vertical direction. The reactor system comprises a second substantially prism-shaped wall arranged around the central axis, a cross section of the second substantially prism-shaped wall surrounds the cross-section of the first substantially prism-shaped wall in a plane perpendicular to the central axis. An outer boundary of the downer section is defined by the first substantially prism-shaped wall in the plane perpendicular to the central axis, and outer boundaries of the riser section are defined by the first substantially prism-shaped wall and the second substantially prism-shaped wall in the plane perpendicular to the central axis. The process comprises cracking the lesser boiling point fraction in the riser section in the presence of a catalyst to produce a first cracking reaction product. The catalyst and the lesser boiling point fraction move co-currently and in a generally upwards direction through the riser section. The process comprises cracking the greater boiling point fraction in the downer reactor in the presence of the catalyst to produce a second cracking reaction product. The catalyst and the greater boiling point fraction move co-currently in a generally downward direction through the downer section. The process comprises passing the catalyst from the riser reactor to the downer reactor, from the downer reactor to a regenerator, and from the regenerator to the riser reactor, wherein an amount of coke on the catalyst is reduced in the regenerator.

According to one or more embodiments described herein, a process for producing petrochemical products from crude oil may comprise separating the crude oil into at least a lesser boiling point fraction and a greater boiling point fraction and passing the lesser boiling point fraction and the greater boiling point fraction to a reactor system. The reactor system comprises a riser section and a downer section. The reactor system comprises a first substantially prism-shaped wall arranged around a central axis, the central axis oriented in a substantially vertical direction. The reactor system comprises a second substantially prism-shaped wall arranged around the central axis, cross section of the second substantially prism-shaped wall surrounds the cross-section of the first substantially prism-shaped wall in the plane perpendicular to the central axis. An outer boundary of the riser section is defined by the first substantially prism-shaped wall in the plane perpendicular to the central axis. Outer boundaries of the downer section are defined by the first substantially prism-shaped wall and the second substantially prism-shaped wall in a plane perpendicular to the central axis. The process includes cracking the lesser boiling point fraction in the riser section in the presence of a catalyst to produce a first cracking reaction product, wherein the catalyst and the lesser boiling point fraction move co-currently and in a generally upwards direction through the riser section. The process includes cracking the greater boiling point fraction in the downer reactor in the presence of the catalyst to produce a second cracking reaction product, wherein the catalyst and the greater boiling point fraction move co-currently in a generally downward direction through the downer section. The process includes passing the catalyst from the riser reactor to the downer reactor, from the downer reactor to a regenerator, and from the regenerator to the riser reactor, wherein an amount of coke on the catalyst is reduced in the regenerator.

Additional features and advantages of the described embodiments will be set forth in the detailed description which follows, and in part will be readily apparent to those skilled in the art from that description or recognized by practicing the described embodiments, including the detailed description which follows, the claims, as well as the appended drawings.

BRIEF DESCRIPTION OF THE DRAWINGS

The following detailed description of specific embodiments of the present disclosure can be best understood when read in conjunction with the following drawings, where like structure is indicated with like reference numerals and in which.

Figure 1:
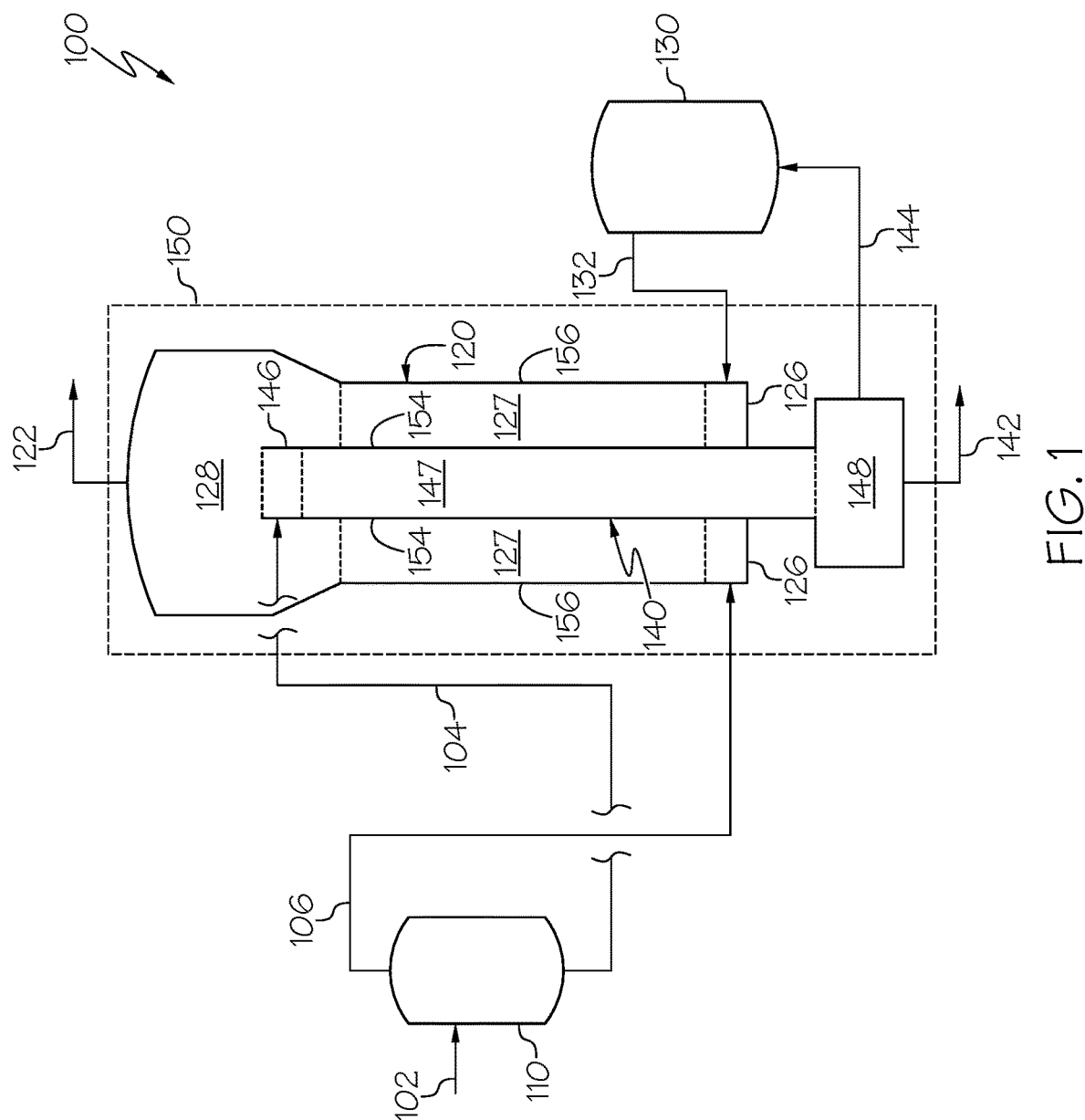
FIG. 1 is a generalized schematic diagram of a hydrocarbon feed conversion system, according to one or more embodiments described in this disclosure.

For the purpose of describing the simplified schematic illustrations and descriptions of the relevant figures, the numerous valves, temperature sensors, electronic controllers and the like that may be employed and well known to those of ordinary skill in the art of certain chemical processing operations are not included. Further, accompanying components that are often included in typical chemical processing operations, such as air supplies, catalyst hoppers, and flue gas handling systems, are not depicted. Accompanying components that are in hydrocracking units, such as bleed streams, spent catalyst discharge subsystems, and catalyst replacement sub-systems are also not shown. It should be understood that these components are within the spirit and scope of the present embodiments disclosed. However, operational components, such as those described in the present disclosure, may be added to the embodiments described in this disclosure.

It should further be noted that arrows in the drawings refer to process streams. However, the arrows may equivalently refer to transfer lines which may serve to transfer process streams between two or more system components. Additionally, arrows that connect to system components define inlets or outlets in each given system component. The arrow direction corresponds generally with the major direction of movement of the materials of the stream contained within the physical transfer line signified by the arrow. Furthermore, arrows which do not connect two or more system components signify a product stream which exits the depicted system or a system inlet stream which enters the depicted system. Product streams may be further processed in accompanying chemical processing systems or may be commercialized as end products. System inlet streams may be streams transferred from accompanying chemical processing systems or may be non-processed feedstock streams. Some arrows may represent recycle streams, which are effluent streams of system components that are recycled back into the system. However, it should be understood that any represented recycle stream, in some embodiments, may be replaced by a system inlet stream of the same material, and that a portion of a recycle stream may exit the system as a system product.

Additionally, arrows in the drawings may schematically depict process steps of transporting a stream from one system component to another system component. For example, an arrow from one system component pointing to another system component may represent "passing" a system component effluent to another system component, which may include the contents of a process stream "exiting" or being "removed" from one system component and "introducing" the contents of that product stream to another system component.

It should be understood that according to the embodiments presented in the relevant figures, an arrow between two system components may signify that the stream is not processed between the two system components. In other embodiments, the stream signified by the arrow may have substantially the same composition throughout its transport between the two system components. Additionally, it should be understood that in one or more embodiments, an arrow may represent that at least 75 wt. %, at least 90 wt. %, at least 95 wt. %, at least 99 wt. %, at least 99.9 wt. %, or even 100 wt. % of the stream is transported between the system components. As such, in some embodiments, less than all of the streams signified by an arrow may be transported between the system components, such as if a slip stream is present.

It should be understood that two or more process streams are "mixed" or "combined" when two or more lines intersect in the schematic flow diagrams of the relevant figures. Mixing or combining may also include mixing by directly introducing both streams into a like reactor, separation device, or other system component. For example, it should be understood that when two streams are depicted as being combined directly prior to entering a separation unit or reactor, that in some embodiments the streams could equivalently be introduced into the separation unit or reactor and be mixed in the reactor.

Reference will now be made in greater detail to various embodiments, some embodiments of which are illustrated in the accompanying drawings. Whenever possible, the same reference numerals will be used throughout the drawings to refer to the same or similar parts.

DETAILED DESCRIPTION

Embodiments of the present disclosure are directed to processes for producing petrochemical products, such as light olefins, from crude oil. The processes include separating a crude oil stream into at least a lesser boiling point fraction and a greater boiling point fraction, and passing the lesser boiling point fraction and the greater boiling point fraction to a reactor system. The reactor system has a riser section and a downer section. The riser section and the downer section of the reactor system may be arranged, as described in detail herein, so either the riser section is arranged around the downer section or the downer section is arranged around the riser section. The riser section and the downer section have a shared wall. This arrangement may reduce heat lost from the reactor system and may reduce the overall footprint of the reactor system, relative to conventional reactor systems. The process may include cracking the lesser boiling point fraction in the riser section and cracking the greater boiling point fraction in the downer section to form product streams comprising light olefins.

As used in this disclosure, a "reactor" refers to a vessel in which one or more chemical reactions may occur between one or more reactants optionally in the presence of one or more catalysts. For example, a reactor may include a tank or tubular reactor configured to operate as a batch reactor, a continuous stirred-tank reactor (CSTR), or a plug flow reactor. Example reactors include packed bed reactors such as fixed bed reactors, and fluidized bed reactors. One or more "reaction zones" may be disposed in a reactor. As used in this disclosure, a "reaction zone" refers to an area where a particular reaction takes place in a reactor. For example, a packed bed reactor with multiple catalyst beds may have multiple reaction zones, where each reaction zone is defined by the area of each catalyst bed.

As described herein, a "riser" is a type of reactor where the general movement of the feed through the reactor is upwards. A riser generally also has an upward catalyst flow, such that the feed and catalyst are co-current. A "downer" is a type of reactor where the general movement of the feed through the reactor is downwards. A downer generally also has a downward catalyst flow, such that the feed and catalyst are co-current.

As used in this disclosure, a "separation unit" refers to any separation device or system of separation devices that at least partially separates one or more chemicals that are mixed in a process stream from one another. For example, a separation unit may selectively separate differing chemical species, phases, or sized material from one another, forming one or more chemical fractions. Examples of separation units include, without limitation, distillation columns, flash drums, knock-out drums, knock-out pots, centrifuges, cyclones, filtration devices, traps, scrubbers, expansion devices, membranes, solvent extraction devices, and the like. It should be understood that separation processes described in this disclosure may not completely separate all of one chemical constituent from all of another chemical constituent. It should be understood that the separation processes described in this disclosure "at least partially" separate different chemical components from one another, and that even if not explicitly stated, it should be understood that separation may include only partial separation. As used in this disclosure, one or more chemical constituents may be "separated" from a process stream to form a new process stream. Generally, a process stream may enter a separation unit and be divided, or separated, into two or more process streams of desired composition. Further, in some separation processes, a "lesser boiling point fraction" (sometimes referred to as a "light fraction") and a "greater boiling point fraction" (sometimes referred to as a "heavy fraction") may exit the separation unit, where, on average, the contents of the lesser boiling point fraction stream have a lesser boiling point than the greater boiling point fraction stream. Other streams may fall between the lesser boiling point fraction and the greater boiling point fraction, such as an "intermediate boiling point fraction."

As used in this disclosure, the term "high-severity conditions" generally refers to FCC temperatures of 500° C. or greater, and a weight ratio of catalyst to hydrocarbon (catalyst to oil ratio) of equal to or greater than 5:1, all of which may be more severe than typical FCC reaction conditions.

It should be understood that an "effluent" generally refers to a stream that exits a system component such as a separation unit, a reactor, or reaction zone, following a particular reaction or separation, and generally has a different composition (at least proportionally) than the stream that entered the separation unit, reactor, or reaction zone.

As used in this disclosure, a "catalyst" refers to any substance that increases the rate of a specific chemical reaction. Catalysts described in this disclosure may be utilized to promote various reactions, such as, but not limited to, cracking (including aromatic cracking). As used in this disclosure, "cracking" generally refers to a chemical reaction where carbon-carbon bonds are broken. For example, a molecule having carbon to carbon bonds is broken into more than one molecule by the breaking of one or more of the carbon to carbon bonds, or is converted from a compound which includes a alkyl or cyclic moiety, such as a alkane, cycloalkane, naphthalene, an aromatic or the like, to an olefinic compound and/or a compound which does not include a cyclic moiety or contains fewer cyclic moieties than prior to cracking.

As used in this disclosure, the term "spent catalyst" refers to catalyst that has been introduced to and passed through a cracking reaction zone to crack a hydrocarbon material, such as the greater boiling point fraction or the lesser boiling point fraction, for example, but has not been regenerated in the regenerator. Semi-spent catalyst refers to catalyst that is not completely spent. Generally, spent catalyst highly reduced activity due to, for example coke deposited on the catalyst. Semi-spent catalyst may have somewhat reduced activity, but not as reduced as the spent catalyst. The "spent catalyst" may have coke deposited on the catalyst and may include partially coked catalyst as well as fully coked catalysts. The amount of coke deposited on the "spent catalyst" may be greater than the amount of coke remaining on the regenerated catalyst following regeneration.

As used in this disclosure, the term "regenerated catalyst" refers to catalyst that has been introduced to a cracking reaction zone and then regenerated in a regenerator to heat the catalyst to a greater temperature, oxidize and remove at least a portion of the coke from the catalyst to restore at least a portion of the catalytic activity of the catalyst, or both. The "regenerated catalyst" may have less coke, a greater temperature, or both compared to spent catalyst and may have greater catalytic activity compared to spent catalyst. The "regenerated catalyst" may have more coke and lesser catalytic activity compared to fresh catalyst that has not passed through a cracking reaction zone and regenerator.

It should further be understood that streams may be named for the components of the stream, and the component for which the stream is named may be the major component of the stream (such as comprising from 50 weight percent (wt. %), from 70 wt. %, from 90 wt. %, from 95 wt. %, from 99 wt. %, from 99.5 wt. %, or even from 99.9 wt. % of the contents of the stream to 100 wt. % of the contents of the stream). It should also be understood that components of a stream are disclosed as passing from one system component to another when a stream comprising that component is disclosed as passing from that system component to another. For example, a disclosed "propylene stream" passing from a first system component to a second system component should be understood to equivalently disclose "propylene" passing from a first system component to a second system component, and the like.

Figure 4:
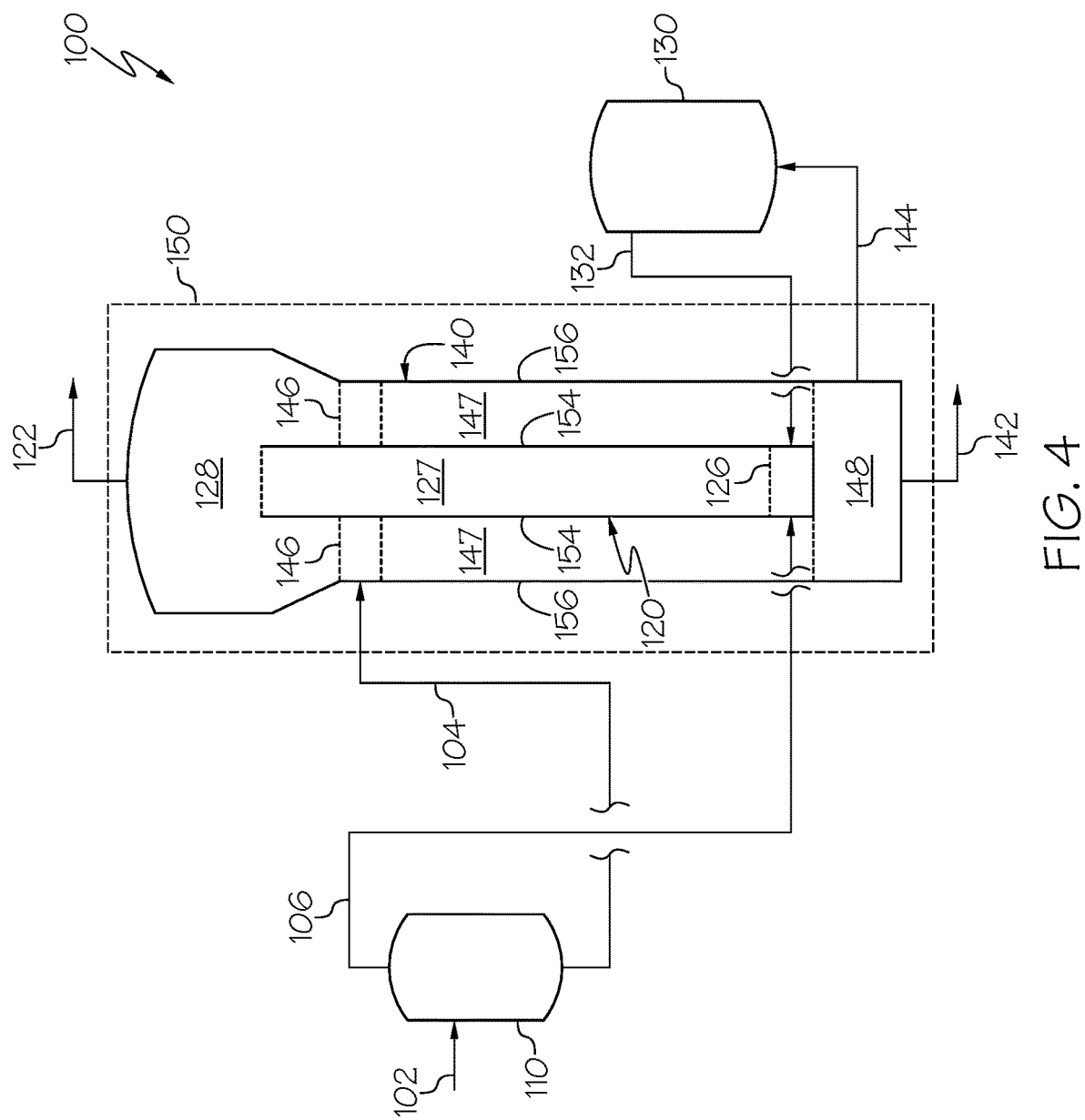
FIG. 4 is a generalized schematic diagram of a hydrocarbon feed conversion system, according to one or more embodiments described in this disclosure.

FIGS. 1 and 4 each depict embodiments of the hydrocarbon feed conversion system 100 described in detail in this disclosure. The hydrocarbon feed conversion system 100 depicted in each of FIGS. 1 and 4 are largely similar with the exception of the arrangement of a riser section 120 and a downer section 140 of a reactor system 150 included in each figure. Embodiments, of hydrocarbon feed conversion system are now described with reference to FIG. 1. However, it should be noted that much of the description of the hydrocarbon feed conversion system 100 described with reference to FIG. 1 is also applicable to the embodiment depicted in FIG. 4.

Referring now to FIG. 1, a hydrocarbon feed conversion system 100 may include a feed separator 110, a reactor system 150 comprising a riser section 120 and a downer section 140, and a regenerator 130. The hydrocarbon feed conversion system 100 generally receives a crude oil stream 102 and directly processes the crude oil stream 102 to produce system product streams 122, 142.

In general terms, the hydrocarbon feed conversion system 100 includes a reactor system 150 comprising a riser section 120 and a downer section 140, wherein a portion of the crude oil stream 102 contacts heated fluidized catalytic particles in a cracking reaction zone maintained at high-severity temperatures and pressures. When the portion of the crude oil stream 102 contacts the hot catalyst and is cracked to lighter products, carbonaceous deposits, commonly referred to as coke, form on the catalyst. The coke deposits formed on the catalyst may reduce the catalytic activity of the catalyst or deactivate the catalyst. Deactivation of the catalyst may result in the catalyst becoming catalytically ineffective. The spent catalyst having coke deposits may be separated from the cracking reaction products, stripped of removable hydrocarbons, and passed to a regeneration process where the coke is burned from the catalyst in the presence of air to produce a regenerated catalyst that is catalytically effective. The term "catalytically effective" refers to the ability of the regenerated catalyst to increase the rate of cracking reactions. The term "catalytic activity" refers to the degree to which the regenerated catalyst increases the rate of the cracking reactions and may be related to a number of catalytically active sites available on the catalyst. For example, coke deposits on the catalyst may cover up or block catalytically active sites on the spent catalyst, thus, reducing the number of catalytically active sites available, which may reduce the catalytic activity of the catalyst. Following regeneration, the regenerated catalyst may have equal to or less than 10 wt. %, 5 wt. %, or even 1 wt. % coke based on the total weight of the regenerated catalyst. The combustion products may be removed from the regeneration process as a flue gas stream. The heated regenerated catalysts may then be recycled back to the cracking reaction zones of the reactor system 150.

The crude oil stream 102 may generally comprise crude oil. As used in this disclosure, the term "crude oil" is to be understood to mean a mixture of petroleum liquids, gases, solids, or combinations of these, including in some embodiments impurities such as sulfur-containing compounds, nitrogen-containing compounds and metal compounds that has not undergone significant separation or reaction processes. Crude oils are distinguished from fractions of crude oil. In certain embodiments the crude oil feedstock may be a minimally treated light crude oil to provide a crude oil feedstock having total metals (Ni+V) content of less than 10 parts per million by weight (ppmw) and Conradson carbon residue of less than 5 wt %. For example, minimal treatment may include hydroprocessing to remove, for example, heavy metals.

In one or more embodiments, the crude oil may have an American Petroleum Institute (API) gravity of from 22 degrees to 40 degrees. For example, the hydrocarbon feed stream 102 utilized may be an Arab heavy crude oil (API gravity of approximately 28°), Arab medium (API gravity of approximately 30°), Arab light (API gravity of approximately 33°), or Arab extra light (API gravity of approximately 39°).

In general, the contents of the crude stream 102 may include a relatively wide variety of chemical species based on boiling point, characteristic of unprocessed crude oils that have not been separated into fractions. For example, the crude oil stream 102 may have composition such that the difference between the 5 wt. % boiling point and the 95 wt. % boiling point of the hydrocarbon feed stream 102 is at least 100° C., at least 200° C., at least 300° C., at least 400° C., at least 500° C., or even at least 600° C.

The crude oil stream 102 may be introduced to the feed separator 110 which may separate the contents of the crude oil stream 102 into at least a lesser boiling point fraction stream 106 and a greater boiling point fraction stream 104. In one or more embodiments, at least 90 wt. %, at least 95 wt. %, at least 99 wt. %, or even at least 99.9 wt. % of the crude oil stream 102 may be present in the combination of the lesser boiling point fraction stream 106 and the greater boiling point fraction stream 104. In one or more embodiments, the feed separator 110 may be a vapor-liquid separator such as a flash drum (sometimes referred to as a breakpot, knock-out drum, knock-out pot, compressor suction drum, or compressor inlet drum). In embodiments that utilize a vapor-liquid separator as the feed separator 110, the greater boiling point fraction stream 104 may exit the feed separator 110 as a liquid and the lesser boiling point fraction stream 106 may exit the feed separator 110 as a vapor. The vapor-liquid separator may be operated at a temperature and pressure suitable to separate the crude oil stream 102 into the lesser boiling point fraction stream 106 and the greater boiling point fraction stream 104. The cut temperature or "cut point" (that is, the approximate atmospheric boiling point temperature separating the lesser boiling point fraction stream 106 and the greater boiling point fraction stream 104) of the vapor-liquid separator may be from 250° C. to 400° C. As such, all components of the lesser boiling point fraction stream may have a boiling point (at atmospheric pressure) of less than or equal to 400° C., less than or equal to 375° C., less than or equal to 350° C., less than or equal to 325° C., less than or equal to 300° C., or less than or equal to 250° C., and all components of the greater boiling point fraction stream may have a boiling point (at atmospheric pressure) of at least 250° C., at least 300° C., at least 325° C., at least 350° C., at least 375° C., or at least 400° C.

In one or more embodiments, the cut point may be approximately 350° C., such as in a range of from 340° C. to 360° C., or from 345° C. to 355° C. In such embodiments, if Arab extra light crude is utilized as a feedstock, the 350° C.+ fraction may include 98.7 wt. % slurry oil, 0.8 wt. % light cycle oil, and 0.5 wt. % naphtha. In such embodiments, the 350° C.-fraction may include 57.5 wt. % naphtha, 38.9 wt. % light cycle oil, and 3.7 wt. % slurry oil.

One or more supplemental feed streams (not shown) may be added to the crude oil stream 102 prior to introducing the crude oil stream 102 to the feed separator 110. As previously described, in one or more embodiments, the crude oil stream 102 may be crude oil. In one or more embodiments, the crude oil stream 102 may be crude oil, and one or more supplemental feed streams comprising one or more of a vacuum residue, tar sands, bitumen, atmospheric residue, vacuum gas oils, demetalized oils, naphtha streams, other hydrocarbon streams, or combinations of these materials, may be added to the crude oil upstream of the feed separator 110.

Still referring to FIG. 1, the lesser boiling point fraction stream 106 and the greater boiling point fraction stream 104 may be passed to a reactor system 150. The reactor system 150 may comprise a riser section 120 and a downer section 140. In one or more embodiments, the lesser boiling point fraction stream 106 may be passed to the riser section 120, where it is catalytically cracked, and the greater boiling point fraction stream 104 may be passed to the downer section 140, where it is catalytically cracked. In the riser section 120, catalyst and reactant move co-currently in a generally upward direction through the riser section 120 during the reaction. In the downer section 140, catalyst and reactant move co-currently in a generally downward direction through the downer section 140 during the reaction. In other words, the catalyst and reactant have an upward superficial velocity in the riser section 120, and the catalyst and reactant have a downward superficial velocity in the downer section 140. As described herein, "superficial velocity" refers to the velocity at which an individual phase flows through a given cross-sectional area. The bulk flow of a phase is used to determine superficial velocity of that phase; thus, individual particles or molecules within a phase may move in a direction different from, or even opposite to, the bulk flow of a phase, without affecting the direction of the superficial velocity of that phase.

Figure 2:
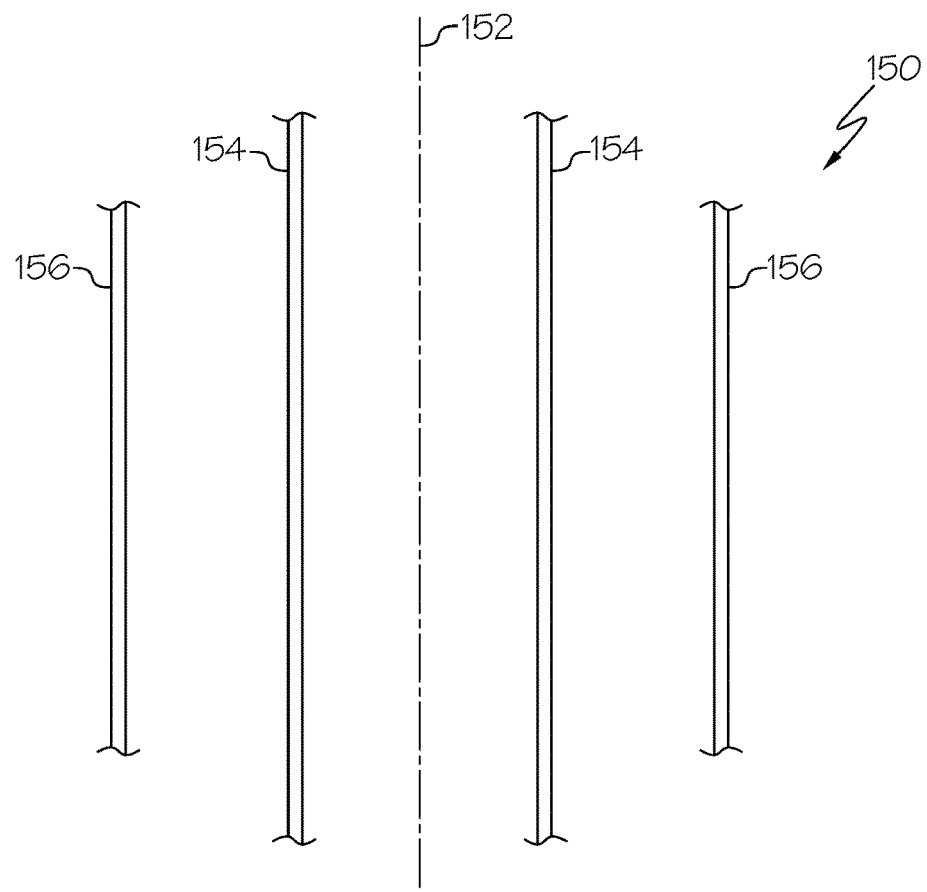
FIG. 2 is a vertical cross-sectional view of a reactor system, according to one or more embodiments described in this disclosure.
Figure 3:
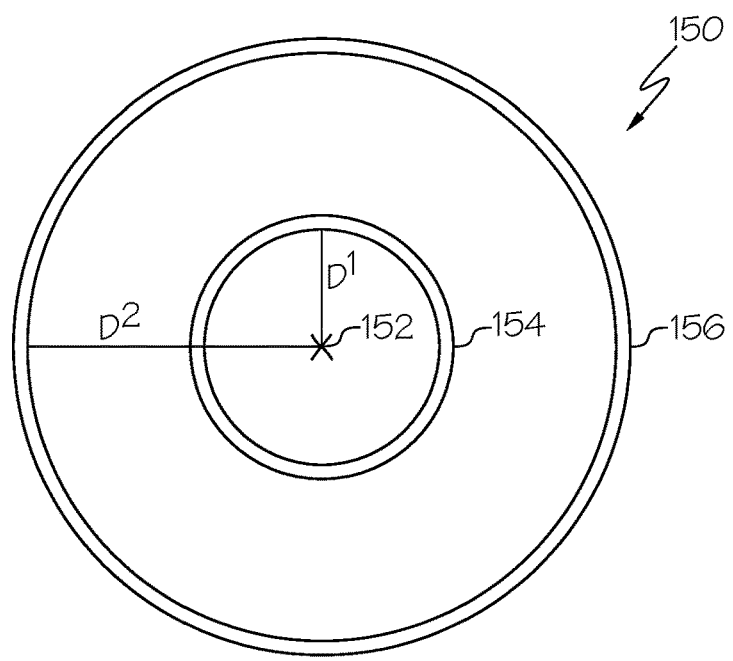
FIG. 3 is a horizontal cross-sectional view of a reactor system, according to one or more embodiments described in this disclosure.

A cross-sectional view of at least a portion of the reactor system 150 is depicted in FIGS. 2 and 3. Referring now to FIGS. 2 and 3, the reactor system 150 may comprise a first substantially prism-shaped wall 154 arranged around a central axis 152. In one or more embodiments, the central axis 152 may be oriented in a substantially vertical direction. As described herein, a "substantially vertical direction" refers to direction that is within 10°, 5°, 2° or even 1° of vertical. The reactor system may further comprise a second substantially prism-shaped wall 156 arranged around the central axis 152. The cross section of the second substantially prism-shaped wall 156 surrounds the cross-section of the first substantially prism-shaped wall 154 in a plane perpendicular to the central axis 156.

As described herein, a "prism-shaped wall" refers to a wall that generally outlines a three dimensional prismatic shape. For example, without limitation, a prism-shaped wall may outline a cylinder (a circular prism), as depicted in FIGS. 2 and 3, or a rectangular prism, or any other polygonal prism, which are not depicted. Prism-shaped walls may have a cross-sectional shape in a plane perpendicular to the central axis. In one or more embodiments, the first substantially prism-shaped wall 154 may have a circular, oval, elliptical, or polygonal cross-sectional shape in a plane perpendicular to the central axis 152. In one or more embodiments, the second substantially prism-shaped wall 156 may have a circular, oval, elliptical, or polygonal cross-sectional shape in a plane perpendicular to the central axis 152.

As described herein, walls may be substantially prism-shaped. It should be understood that the walls of the reactor system 150 described herein may not be exactly prism-shaped. For example, without limitation, reactor walls may have openings for feed inlets, product outlets, and various sensors, such as but not limited to, temperature and pressure sensors. Additionally, reactor walls may include minor imperfections in shape that do not affect the performance of the reactor, but may prevent the reactor wall from being exactly prism-shaped. Accordingly, the walls of the reactor system 150 described herein may be "substantially prism-shaped."

Referring now to the embodiment depicted in FIG. 3, the first substantially prism-shaped wall 154 may have a circular cross-sectional shape in a plane perpendicular to the central axis 152. The second substantially prism-shaped wall 156 may have a circular cross-sectional shape in a plane perpendicular to the central axis 152. The first substantially prism-shaped wall 154 may be a first radial distance D' from the central axis 152, and the second substantially prism-shaped wall may be a second radial distance D 2 from the central axis 152. In one or more embodiments, the second radial distance D 2 may be greater than the first radial distance D'.

The riser section 120 and the downer section 140 of the reactor system may be defined by the substantially prism-shaped walls of the reactor system 150. FIG. 1 depicts an embodiment of the reactor system 150 wherein the riser section 120 is positioned around the downer section 140, and FIG. 4 depicts an embodiment of the reactor system 150 wherein the downer section 140 is positioned around the riser section 120. Referring now to FIG. 1 and FIG. 2, an outer boundary of the downer section 140 is defined by the first substantially prism-shaped wall 154 in the plane perpendicular to the central axis 152. The outer boundaries of the riser section 120 are defined by the first substantially prism-shaped wall 154 and the second substantially prism-shaped wall 156 in the plane perpendicular to the central axis 152. In one or more embodiments, a cross section of the downer section 140, perpendicular to the central axis 152, is circular, and a cross section of the riser section 120, perpendicular to the central axis 152, is annular.

Referring now to FIG. 2 and FIG. 4, an outer boundary of the riser section 120 is defined by the first substantially prism-shaped wall 154 in the plane perpendicular to the central axis 152. The outer boundaries of the downer section 140 are defined by the first substantially prism-shaped wall 154 and the second substantially prism-shaped wall 156 in the plane perpendicular to the central axis 152. In one or more embodiments, a cross section of the riser section 120, perpendicular to the central axis 152, is circular, and a cross section of the downer section 140, perpendicular to the central axis 152, is annular.

Without intending to be bound by theory, the use of reactor systems including a riser sections and a downer sections, as described herein, may reduce the overall footprint of the reactor system, compared to a reactor system having a stand-alone riser reactor and a stand-alone downer reactor. Conventional reactor systems, such as the reactor system described in U.S. patent application Ser. No. 17/570, 526, the entire contents of which are incorporated by reference herein, utilize a stand-alone riser reactor and a sand-alone downer reactor. By arranging the riser section and the downer section, as described herein, less space may be occupied by the reactor system in a facility for processing crude to produce products, such as light olefins, than is used by the separate riser and downer reactors of conventional reactor systems.

Additionally, the use of reactor systems including riser sections and downer sections arranged as described in the present disclosure may shorten the standpipes necessary to transport catalyst and from the riser section to the downer section, again compared to a reactor system having a stand-alone riser reactor and a stand-alone downer reactor, such as the reactor system described in U.S. patent application Ser. No. 17/570,526. For example, when separate riser and downer reactors are used, standpipes are used to transport catalyst between the riser and downer reactors and to transport catalyst between the regenerator and the reactors. In embodiments of the presently disclosed reactor system, the close proximity of the riser section and the downer section minimize the need for standpipes between the riser and downer sections of the reactor system. It should be noted that the minimization of standpipes in the reactor system and the relatively close arrangement of the riser and downer sections in the reactor systems described herein may also reduce the catalyst inventory of the reactor system. In turn, this may enable the use of a smaller regenerator in the hydrocarbon feed conversion systems described herein than is required in conventional hydrocarbon feed conversion systems. Minimization of the number of standpipes and reduction in the size of the regenerator may reduce the cost of process equipment necessary to construct and utilize the hydrocarbon feed conversion systems described herein, providing a benefit over conventional systems.

Furthermore, the use of reactor systems including a riser section and a downer section arranged as described herein may reduce heat lost from the reactor system relative to reactor systems that use separate riser and downer reactors.

Without intending to be bound by theory, when stand-alone riser and downer reactors are used, heat may be lost from the riser reactor to the atmosphere and from the downer reactor to the atmosphere. On the other hand, when the reactor system described herein is used, heat from only one of the riser or downer sections may be transferred to the atmosphere. For example, either the riser or downer section, depending on the configuration of the reactor system, may act as an additional insulator for the other section, as the riser section and the downer section share a wall. This may reduce the amount of heat lost to the atmosphere during operation of the reactor system. Without intending to be bound by theory, reducing the amount of heat lost from the reactor system may reduce a need to burn fuel oil in the regenerator to maintain the heat balance of the reactor system. In a heat deficient fluid catalytic cracking process, heat may be added to the regenerator by burning fuel oil. The amount of fuel oil required may be significant, in some cases about 4 to 5 wt. % based on the total feed. Accordingly, reducing the heat lost from the reactor system may reduce fuel oil consumption and improve the overall economics of operating the reactor system.

Referring now to FIGS. 1 and 4, in one or more embodiments, the riser section 120 may comprise a mixing zone 126 and a cracking reaction zone 127. The lesser boiling point fraction stream 106 may be combined or mixed with the catalyst from catalyst stream 132 in the mixing zone 126 and then cracked in the cracking reaction zone 127 to produce a mixture of a semi-spent catalyst and a first cracking reaction product. The reactor system 150 may further comprise a first separator 128. The first separator 128 may be in fluid communication with the riser section 120 and the downer section 140. The first separator 128 may be operable to separate at least a portion of the first cracking reaction product from the semi-spent catalyst so the first cracking reaction product stream 122 may be passed from the reactor system 150 and the semi-spent catalyst may be passed to the downer section 140.

In one or more embodiments, the downer section 140 may comprise a mixing zone 146 and a cracking reaction zone 147. The greater boiling point fraction stream 104 may be combined with the semi-spent catalyst from first separator 128 in the mixing zone 146 and then cracked in the cracking reaction zone 147 to produce a mixture of spent catalyst and a second cracking reaction product. The reactor system 150 may further comprise a second separator 148. The second separator 148 may be in fluid communication with the downer section 140 and the regenerator 130. The second separator 148 may be operable to separate at least a portion of the second cracking reaction product from the spent catalyst so the second cracking reaction product stream 142 may be passed from the reactor system 150 and the spent catalyst may be passed to the regenerator 130 as spent catalyst stream 144.

According to one or more embodiments, the riser section 120 and the downer section unit 140 may operate at temperatures of from 500° C. to 700° C. For example, the riser section 120 and the downer section 140 may operate at temperatures of from 500° C. to 525° C., from 525° C. to 550° C., from 550° C. to 575° C., from 575° C. to 600° C., from 600° C. to 625° C., from 625° C. to 650° C., from 650° C. to 675° C., from 675° C. to 700° C., or any combination of these ranges.

According to some embodiments, the riser section 120 may operate at a greater temperature than downer section 140. For example, the riser section 120 may operate at a temperature of from 600° C. to 680° C., and the downer section 140 may operate at a temperature of from 580° C. to 640° C. For example, the riser section 120 may operate at a temperature of from 600° C. to 620° C., from 620° C. to 640° C., from 640° C. to 660° C., from 660° C. to 680° C., or any combinations of these ranges. For example, the downer section 140 may operate at a temperature of from 580° C. to 600° C., from 600° C. to 620° C., from 620° C. to 640° C., or combinations of these ranges. In embodiments, the riser section 120 may operate at a temperature at least 5° C. greater, at least 10° C. greater, at least 15° C. greater, at least 20° C. greater, at least 25° C. greater, at least 30° C. greater, at least 35° C. greater, at least 40° C. greater, at least 45° C. greater, or even at least 50° C. greater than the downer section 140.

According to embodiments, the catalyst to hydrocarbon ratio in the rise section 120 and the downer section 140 may be from 10:1 to 30:1. For example, the catalyst to hydrocarbon ratio in the riser section 120 may be from 10:1 to 15:1, from 15:1 to 20:1, from 20:1 to 25:1, from 25:1 to 30:1, or combinations of these ranges. The catalyst to hydrocarbon ratio in the downer section 140 may be from 10:1 to 15:1, from 15:1 to 20:1, from 20:1 to 25:1, from 25:1 to 30:1, or combinations of these ranges.

In one or more embodiments, the residence time in the riser section 120 (i.e., the average time of catalyst and hydrocarbon contact) may be greater than the residence time in the downer section 140, such as by at least 0.1 seconds (sec), at least 0.2 sec, at least 0.3 sec, at least 0.4 sec, at least 0.5 sec, at least 0.6 sec, at least 0.7 sec, at least 0.8 sec, at least 0.9 sec, at least 1 sec, at least 2 sec, or even at least 3 sec. Generally, risers may have longer residence times than downers when somewhat similar in size. In embodiments, the residence time of the riser section 120 may be from 0.2 sec to 5 sec, from 0.5 sec to 1 sec, from 1 sec to 1.5 sec, from 1.5 sec to 2 sec, from 2 sec to 2.5 sec, from 2.5 sec to 3 sec, or from 3 sec to 3.5 sec, from 3.5 sec to 4 sec, from 4 sec to 4.5 sec, from 4.5 sec to 5 sec, or combinations of these ranges. In embodiments, the residence time of the downer section 140 may be from 0.2 sec to 5 sec, from 0.5 sec to 1 sec, from 1 sec to 1.5 sec, from 1.5 sec to 2 sec, from 2 sec to 2.5 sec, from 2.5 sec to 3 sec, or from 3 sec to 3.5 sec, from 3.5 sec to 4 sec, from 4 sec to 4.5 sec, from 4.5 sec to 5 sec, or combinations of these ranges.

The first cracking reaction product stream 122 and the second cracking reaction product stream 142 each may include a mixture of cracked hydrocarbon materials, which may be further separated into one or more greater value petrochemical products and recovered from the system. For example, the first cracking reaction product stream 122, the second cracking reaction product stream 142, or both, may include one or more of cracked gas oil, cracked gasoline, cracked naphtha, mixed butenes, butadiene, propene, ethylene, other olefins, ethane, methane, other petrochemical products, or combinations of these. The cracked gasoline may be further processed to obtain aromatics such as benzene, toluene, xylenes, or other aromatics for example.

Still referring to FIGS. 1 and 4, the catalyst in the hydrocarbon feed conversion system 100 may be recycled by passing from the riser section 120 to the downer section 140 to the regenerator 130 and back to the riser section 120 in a continuous loop. As such, the same catalyst is utilized in the reactions in the riser section 120 and the downer section 140.

In embodiments, the regenerator 130 processes the catalyst by removing coke (i.e., at least a major portion of the coke) and raising the catalyst temperature (by the burning of coke for example). As described herein, the "removing" of coke from the catalyst refers to removal of at least a portion of the coke, but some residual coke may remain on the catalyst, as would be understood by those skilled in the art. The catalyst passed from the regenerator 130 to the riser section 120 is regenerated catalyst, and has relatively high catalytic activity. The catalyst passed from the riser section 120 to the downer section 140 is semi-spent catalyst, and has moderate catalytic activity. The catalyst passed from the downer section 140 to the regenerator 130 is spent catalyst, and has relatively low catalytic activity.

The catalyst used in the hydrocarbon feed conversion system 100 may include one or more fluid catalytic cracking catalysts that are suitable for use in the riser section 120 and the downer section 140. The catalyst may be a heat carrier and may provide heat transfer to the riser section 120 and the downer section 140. The catalyst may also have a plurality of catalytically active sites, such as acidic sites for example, that promote the cracking reaction. For example, in embodiments, the catalyst may be a high-activity FCC catalyst having high catalytic activity. Examples of fluid catalytic cracking catalysts suitable for use in the hydrocarbon feed conversion system 100 may include, without limitation, zeolites, silica-alumina catalysts, carbon monoxide burning promoter additives, bottoms cracking additives, light olefin-producing additives, other catalyst additives, or combinations of these components. Zeolites that may be used as at least a portion of the catalyst for cracking may include, but are not limited to Y, REY, USY, RE-USY zeolites, or combinations of these. The catalyst may also include a shaped selective catalyst additive, such as ZSM-5 zeolite crystals or other pentasil-type catalyst structures, which are often used in other FCC processes to produce light olefins and/or increase FCC gasoline octane. In one or more embodiments, the catalyst may include a mixture of a ZSM-5 zeolite crystals and the cracking catalyst zeolite and matrix structure of a typical FCC cracking catalyst. In one or more embodiments, the catalyst may be a mixture of Y and ZSM-5 zeolite catalysts embedded with clay, alumina, and binder.

In one or more embodiments, at least a portion of the catalyst may be modified to include one or more rare earth elements (15 elements of the Lanthanide series of the IUPAC Periodic Table plus scandium and yttrium), alkaline earth metals (Group 2 of the IUPAC Periodic Table), transition metals, phosphorus, fluorine, or any combination of these, which may enhance olefin yield in the riser section 120, the downer section 140, or both. Transition metals may include "an element whose atom has a partially filled d sub-shell, or which can give rise to cations with an incomplete d sub-shell" [IUPAC, Compendium of Chemical Terminology, 2nd ed. (the "Gold Book") (1997). Online corrected version: (2006—) "transition element"]. One or more transition metals or metal oxides may also be impregnated onto the catalyst. Metals or metal oxides may include one or more metals from Groups 6-10 of the IUPAC Periodic Table. In some embodiments, the metals or metal oxides may include one or more of molybdenum, rhenium, tungsten, or any combination of these. In one or more embodiments, a portion of the catalyst may be impregnated with tungsten oxide.

The regenerator 130 may by any suitable combustion regenerator, where combustion gas such as air or other oxygen containing gas streams are passed into the regenerator 130 and flue gas is expelled. The combustion gases may include one or more of combustion air, oxygen, fuel gas, fuel oil, other components, or any combinations of these. In the regenerator 130, the coke deposited on the spent catalyst from the downer section 140 may at least partially oxidize (combust) in the presence of the combustion gases to form at least carbon dioxide and water. In some embodiments, the coke deposits on the spent catalyst may be fully oxidized in the regenerator 130. Other organic compounds, such as residual first cracking reaction product or second cracking reaction product for example, may also oxidize in the presence of the combustion gases in the regenerator 130. Other gases, such as carbon monoxide for example, may be formed during coke oxidation in the regenerator 130. Oxidation of the coke deposits produces heat, which may be transferred to and retained by the regenerated catalyst passed to the riser section 120 via catalyst stream 132.

Generally, the regenerated catalyst has less coke deposit than the semi-spent catalyst, and the semi-spent catalyst has less coke deposit than the spent catalyst. The regenerated catalyst passing out of the regenerator 130 may have less than 1 wt. % coke deposits, based on the total weight of the regenerated catalyst. In some embodiments, the regenerated catalyst passing out of the regenerator 130 may have less than 0.5 wt. %, less than 0.1 wt. %, or less than 0.05 wt. % coke deposits. In some embodiments, the regenerated catalyst passing out of the regenerator 130 to the riser section 120 may have from 0.001 wt. % to 1 wt. %, from 0.001 wt. % to 0.5 wt. %, from 0.001 wt. % to 0.1 wt. %, from 0.001 wt. % to 0.05 wt. %, from 0.005 wt. % to 1 wt. %, from 0.005 wt. % to 0.5 wt. %, from 0.005 wt. % to 0.1 wt. %, from 0.005 wt. % to 0.05 wt. %, from 0.01 wt. % to 1 wt. %, from 0.01 wt. % to 0.5 wt. % to 0.01 wt. % to 0.1 wt. %, from 0.01 wt. % to 0.05 wt. % coke deposits, based on the total weight of the regenerated catalyst. In one or more embodiments, the regenerated catalyst passing out of regenerator 130 may be substantially free of coke deposits. As used in this disclosure, the term "substantially free" of a component means less than 1 wt. % of that component in a particular portion of a catalyst, stream, or reaction zone. As an example, the regenerated catalyst that is substantially free of coke deposits may have less than 1 wt. % of coke deposits. Removal of the coke deposits from the regenerated catalyst in the regenerator 130 may remove the coke deposits from the catalytically active sites, such as acidic sites for example, of the catalyst that promote the cracking reaction. Removal of the coke deposits from the catalytically active sites on the catalyst may increase the catalytic activity of the regenerated catalyst compared to the spent catalyst passing from the downer section 140. Thus, the regenerated catalyst may have a catalytic activity that is greater than the spent catalyst passed from the downer section 140 and the semi-spent catalyst passed from riser section 120 to the downer section 140.

The regenerated catalyst may absorb at least a portion of the heat generated from combustion of the coke deposits. The heat may increase the temperature of the regenerated catalyst compared to the temperature of the spent catalyst.

The methods described herein have numerous advantages over conventional FCC systems. For example, when the hydrocarbon feed stream 102 is cut such that a greater boiling point fraction stream 104 and lesser boiling point fraction stream 106 are formed, the presently disclosed processes allow for enhanced conversion by treating the greater boiling point fraction stream 104 and lesser boiling point fraction stream 106 with different reaction conditions by utilizing a reactor system 150 including a riser section 120 and a downer section 140, and by cycling the catalyst as described. Without being bound by theory, it is believed that the greater boiling point fraction stream 104 may be cracked with lower temperatures, lower residence time, and with less active catalyst than the lesser boiling point fraction stream 106. The systems described herein achieve this result by utilising a riser section 120 and a downer section 140 in the reactor system 150, respectively, to control residence time. Also, by cycling the catalyst as described, large loads of heat may be passed to the riser section 120 by the combustion of the catalyst in the regenerator 130 immediately upstream. Lower temperatures in the downer section 140 are tolerated, allowing the catalyst to be passed from the riser section 120 to the downer section 140 without an intermediate regeneration step. Additionally, the catalytic activity used to treat the greater boiling point fraction stream 104 in the downer section 140 may be relatively low, allowing for the non-necessity of a catalyst regeneration step immediately upstream of the downer section 140.

Moreover, it has been found that the cracking of the lesser boiling point fraction stream 106 in the riser section 120 does not form great amounts of coke, so the catalytic activity in the downer section 140 is tolerable for cracking the heavier materials in the greater boiling point fraction stream 104. Without being bound by theory, it is believed that this reduced coking is due to the lesser ease of cracking of the lesser boiling point fraction stream 106. However, the relatively easier cracking of the greater boiling point fraction stream 104 may cause increased coking, which is immediately mitigated by the direct passing of the catalyst from the downer section 140 to the regenerator 130. Conventional systems may regenerate all catalyst entering an FCC and not loop the catalyst through a riser section 120, downer section 140, and regenerator 130. Additionally, the presently described system may utilize a reduced catalyst inventory compared to conventional systems because catalyst is not regenerated between the riser section 120 and the downer section 140. These and other advantages are presented by the currently disclosed embodiments, as is described herein.

EXAMPLES

The various embodiments of methods and systems for the conversion of feedstock fuels will be further clarified by the following examples. The examples are illustrative in nature, and should not be understood to limit the subject matter of the present disclosure.

A catalyst was steam deactivated (100% steam at 810° C. for 6 hours) prior to testing. The deactivated catalyst was reacted with the lesser boiling point fraction stream (350° C.-of Arab extra light crude at a reactor temperature of 640° C. and a catalyst to oil ratio of 30 wt/wt. The catalyst exiting the reactor ("semi-spent catalyst") was collected in the stripper. This semi-spent catalyst was maintained under an inert (nitrogen) atmosphere and the deposited coke was not burned off. Multiple repeat runs were conducted to collect a sufficient amount of catalyst to be used in subsequent testing. The carbon remaining on the semi-spent catalyst was measured using a small amount of sample (0.04 wt. % carbon on catalyst). This catalyst was then transferred under inert conditions back into the catalyst feed hopper and then used to react with the greater boiling point fraction stream of Arab extra light crude (350° C.+, marked HF-AXL in Table 1). The testing conditions with the corresponding yields are shown in the second column of Table 1, marked Semi-Spent LF catalyst. These yields are representative of the HF-AXL yield when running the systems presently disclosed, where catalyst to the reactor treating the heavy fraction is first used to crack the lighter fraction. As a comparison, the third column of Table 1 shows the yields when the HF-AXL crude is cracked using fresh deactivated catalyst, where less coke is present. As shown, yields of products are comparable, showing that catalyst previously used in the cracking of the light fraction is unexpectedly, sufficient for cracking the heavy fraction.

TABLE 1

| | Feed | |
|---|---|---|
| | HF AXL | HF AXL |
| | Catalyst | |
| | Semi-spent LF catalyst | Deactivated Catalyst |
| Carbon on cat (wt %) | 0.04 | 0.02 |
| Reaction Temp. (° C.) | 608 | 610 |
| Cat/Oil (wt/wt) | 29 | 30 |
| Yield, wt % | | |
| Dry gas & LPG | 46.53 | 46.82 |
| Liquid products | 53.47 | 53.18 |

According to a first aspect of the present disclosure, a process for producing petrochemical products from crude oil comprises separating the crude oil into at least a lesser boiling point fraction and a greater boiling point fraction and passing the lesser boiling point fraction and the greater boiling point fraction to a reactor system. The reactor system comprises a riser section and a downer section. The reactor system comprises a first substantially prism-shaped wall arranged around a central axis, the central axis oriented in a substantially vertical direction. The reactor system comprises a second substantially prism-shaped wall arranged around the central axis, a cross section of the second substantially prism-shaped wall surrounds the cross-section of the first substantially prism-shaped wall in a plane perpendicular to the central axis. An outer boundary of the downer section is defined by the first substantially prism-shaped wall in the plane perpendicular to the central axis, and outer boundaries of the riser section are defined by the first substantially prism-shaped wall and the second substantially prism-shaped wall in the plane perpendicular to the central axis. The process comprises cracking the lesser boiling point fraction in the riser section in the presence of a catalyst to produce a first cracking reaction product. The catalyst and the lesser boiling point fraction move co-currently and in a generally upwards direction through the riser section. The process comprises cracking the greater boiling point fraction in the downer reactor in the presence of the catalyst to produce a second cracking reaction product. The catalyst and the greater boiling point fraction move co-currently in a generally downward direction through the downer section. The process comprises passing the catalyst from the riser reactor to the downer reactor, from the downer reactor to a regenerator, and from the regenerator to the riser reactor, wherein an amount of coke on the catalyst is reduced in the regenerator.

A second aspect of the present disclosure may include the first aspect, where the first substantially prism-shaped wall has a circular, oval, elliptical, or polygonal cross-sectional shape in a plane perpendicular to the central axis, and the second substantially prism-shaped wall has a circular, oval, elliptical, or polygonal cross-sectional shape in a plane perpendicular to the central axis.

A third aspect of the present disclosure may include either the first or second aspect, where the first substantially prism-shaped wall has a circular cross-sectional shape in a plane perpendicular to the central axis and the second substantially prism-shaped wall has a circular cross-sectional shape in a plane perpendicular to the central axis, wherein the first substantially prism-shaped wall is a first radial distance from the central axis, the second prism-shaped wall is a second radial distance from the central axis, and the second radial distance is greater than the first radial distance.

A fourth aspect of the present disclosure may include any of the first through third aspects, where a cross section of the downer section, perpendicular to the central axis, is circular, and a cross section of the riser section, perpendicular to the central axis, is annular.

A fifth aspect of the present disclosure may include any of the first through fourth aspects, where the reactor system further comprises a first separator and a second separator, wherein the first separator is in fluid communication with the riser section and the downer section, and wherein the second separator is in fluid communication with the downer section and the regenerator.

A sixth aspect of the present disclosure may include any of the first through fifth aspects, where a reaction temperature in the riser section is from 620° C. to 680° C., and a reaction temperature in the downer section is from 580° C. to 640° C.

A seventh aspect of the present disclosure may include any of the first through sixth aspects, where a residence time in the riser section is from 0.2 seconds to 5 seconds, and a residence time in the downer section is from 0.2 second to 2 seconds.

An eighth aspect of the present disclosure may include any of the first through seventh aspects, where the catalyst to hydrocarbon ratio in the riser section and downer section is from 10:1 to 30:1.

A ninth aspect of the present disclosure may include any of the first through eighth aspects, where a cut point of the lesser boiling point fraction and the greater boiling point fraction is from 250° C. to 400° C.

A tenth aspect of the present disclosure may include any of the first through ninth aspects, where the first cracking reaction product, the second cracking reaction product, or both, comprise at least one of ethylene, propene, butene, or pentene.

According to an eleventh aspect of the present disclosure, a process for producing petrochemical products from crude oil may comprise separating the crude oil into at least a lesser boiling point fraction and a greater boiling point fraction and passing the lesser boiling point fraction and the greater boiling point fraction to a reactor system. The reactor system comprises a riser section and a downer section. The reactor system comprises a first substantially prism-shaped wall arranged around a central axis, the central axis oriented in a substantially vertical direction. The reactor system comprises a second substantially prism-shaped wall arranged around the central axis, cross section of the second substantially prism-shaped wall surrounds the cross-section of the first substantially prism-shaped wall in the plane perpendicular to the central axis. An outer boundary of the riser section is defined by the first substantially prism-shaped wall in the plane perpendicular to the central axis. Outer boundaries of the downer section are defined by the first substantially prism-shaped wall and the second substantially prism-shaped wall in a plane perpendicular to the central axis. The process includes cracking the lesser boiling point fraction in the riser section in the presence of a catalyst to produce a first cracking reaction product, wherein the catalyst and the lesser boiling point fraction move co-currently and in a generally upwards direction through the riser section. The process includes cracking the greater boiling point fraction in the downer reactor in the presence of the catalyst to produce a second cracking reaction product, wherein the catalyst and the greater boiling point fraction move co-currently in a generally downward direction through the downer section. The process includes passing the catalyst from the riser reactor to the downer reactor, from the downer reactor to a regenerator, and from the regenerator to the riser reactor, wherein an amount of coke on the catalyst is reduced in the regenerator.

A twelfth aspect of the present disclosure may include the eleventh aspect, where the first substantially prism-shaped wall has a circular, oval, elliptical, or polygonal cross-sectional shape in the plane perpendicular to the central axis, and the second substantially prism-shaped wall has a circular, oval, elliptical, or polygonal cross-sectional shape in the plane perpendicular to the central axis.

A thirteenth aspect of the present disclosure may include either the eleventh or twelfth aspect, where the first substantially prism-shaped wall has a circular cross-sectional shape in the plane perpendicular to the central axis and the second substantially prism-shaped wall has a circular cross-sectional shape in the plane perpendicular to the central axis, wherein the first prism-shaped wall is a first radial distance from the central axis, the second prism-shaped wall is a second radial distance from the central axis, and the second radial distance is greater than the first radial distance.

A fourteenth aspect of the present disclosure may include any of the eleventh through thirteenth aspects, where a cross section of the riser section, perpendicular to the central axis, is circular, and a cross section of the downer section, perpendicular to the central axis, is annular.

A fifteenth aspect of the present disclosure may include any of the eleventh through fourteenth aspects, where the reactor system further comprises a first separator and a second separator, wherein the first separator is in fluid communication with the riser section and the downer section, and wherein the second separator is in fluid communication with the downer section zone and the regenerator.

A sixteenth aspect of the present disclosure may include any of the eleventh through fifteenth aspects, where a reaction temperature in the riser section is from 620° C. to 680° C., and a reaction temperature in the downer section is from 580° C. to 640° C.

A seventeenth aspect of the present disclosure may include any of the eleventh through sixteenth aspects, where a residence time in the riser section is from 0.2 seconds to 5 seconds, and a residence time in the downer section is from 0.2 second to 2 seconds.

An eighteenth aspect of the present disclosure may include any of the eleventh through seventeenth aspects, where the catalyst to hydrocarbon ratio in the riser section and downer section is from 10:1 to 30:1.

A nineteenth aspect of the present disclosure may include any of the eleventh through eighteenth aspects, where a cut point of the lesser boiling point fraction and the greater boiling point fraction is from 250° C. to 400° C.

A twentieth aspect of the present disclosure may include any of the eleventh through nineteenth aspects, where the first cracking reaction product, the second cracking reaction product, or both, comprise at least one of ethylene, propene, butene, or pentene.

For the purposes of defining the present technology, the transitional phrase "consisting of" may be introduced in the claims as a closed preamble term limiting the scope of the claims to the recited components or steps and any naturally occurring impurities.

For the purposes of defining the present technology, the transitional phrase "consisting essentially of" may be introduced in the claims to limit the scope of one or more claims to the recited elements, components, materials, or method steps as well as any non-recited elements, components, materials, or method steps that do not materially affect the novel characteristics of the claimed subject matter.

The transitional phrases "consisting of" and "consisting essentially of" may be interpreted to be subsets of the open-ended transitional phrases, such as "comprising" and "including," such that any use of an open ended phrase to introduce a recitation of a series of elements, components, materials, or steps should be interpreted to also disclose recitation of the series of elements, components, materials, or steps using the closed terms "consisting of" and "consisting essentially of." For example, the recitation of a composition "comprising" components A, B and C should be interpreted as also disclosing a composition "consisting of" components A, B, and C as well as a composition "consisting essentially of" components A, B, and C.

Any quantitative value expressed in the present application may be considered to include open-ended embodiments consistent with the transitional phrases "comprising" or "including" as well as closed or partially closed embodiments consistent with the transitional phrases "consisting of" and "consisting essentially of."

It should be understood that any two quantitative values assigned to a property may constitute a range of that property, and all combinations of ranges formed from all stated quantitative values of a given property are contemplated in this disclosure. It should be appreciated that compositional ranges of a chemical constituent in a stream or in a reactor should be appreciated as containing, in some embodiments, a mixture of isomers of that constituent. For example, a compositional range specifying butene may include a mixture of various isomers of butene. It should be appreciated that the examples supply compositional ranges for various streams, and that the total amount of isomers of a particular chemical composition can constitute a range.

The subject matter of the present disclosure has been described in detail and by reference to specific embodiments. It should be understood that any detailed description of a component or feature of an embodiment does not necessarily imply that the component or feature is essential to the particular embodiment or to any other embodiment. Further, it should be apparent to those skilled in the art that various modifications and variations can be made to the described embodiments without departing from the spirit and scope of the claimed subject matter.

What is claimed is:

1. A process for producing petrochemical products from crude oil, the process comprising:
   separating the crude oil into at least a lesser boiling point fraction and a greater boiling point fraction;
   passing the lesser boiling point fraction and the greater boiling point fraction to a reactor system, the reactor system comprising a riser section and a downer section, wherein:
      the reactor system comprises a first substantially prism-shaped wall arranged around a central axis, the central axis oriented in a substantially vertical direction;
      the reactor system comprises a second substantially prism-shaped wall arranged around the central axis, a cross section of the second substantially prism-shaped wall surrounds the cross-section of the first substantially prism-shaped wall in a plane perpendicular to the central axis;
      an outer boundary of the downer section is defined by the first substantially prism-shaped wall in the plane perpendicular to the central axis;
      outer boundaries of the riser section are defined by the first substantially prism-shaped wall and the second substantially prism-shaped wall in the plane perpendicular to the central axis;
   cracking the lesser boiling point fraction in the riser section in the presence of a catalyst to produce a first cracking reaction product, wherein the catalyst and the lesser boiling point fraction move co-currently and in a generally upwards direction through the riser section;
   separating at least a portion of the first cracking reaction product from the catalyst such that a first cracking reaction product stream is passed out of the reactor system and the catalyst is passed to the downer section;
   cracking the greater boiling point fraction in the downer reactor in the presence of the catalyst to produce a second cracking reaction product, wherein the catalyst and the greater boiling point fraction move co-currently in a generally downward direction through the downer section; and
   passing the catalyst from the riser reactor to the downer reactor, from the downer reactor to a regenerator, and from the regenerator to the riser reactor, wherein an amount of coke on the catalyst is reduced in the regenerator.

2. The process of claim 1, wherein the first substantially prism-shaped wall has a circular, oval, elliptical, or polygonal cross-sectional shape in a plane perpendicular to the central axis, and the second substantially prism-shaped wall has a circular, oval, elliptical, or polygonal cross-sectional shape in a plane perpendicular to the central axis.

3. The process of claim 1, wherein the first substantially prism-shaped wall has a circular cross-sectional shape in a plane perpendicular to the central axis and the second substantially prism-shaped wall has a circular cross-sectional shape in a plane perpendicular to the central axis, wherein the first substantially prism-shaped wall is a first radial distance from the central axis, the second prism-shaped wall is a second radial distance from the central axis, and the second radial distance is greater than the first radial distance.

4. The process of claim 1, wherein a cross section of the downer section, perpendicular to the central axis, is circular, and a cross section of the riser section, perpendicular to the central axis, is annular.

5. The process of claim 1, wherein the reactor system further comprises a first separator and a second separator, wherein the first separator is in fluid communication with the riser section and the downer section, and wherein the second separator is in fluid communication with the downer section and the regenerator.

6. The process of claim 1, wherein a reaction temperature in the riser section is from 620° C. to 680° C., and a reaction temperature in the downer section is from 580° C. to 640° C.

7. The process of claim 1, wherein a residence time in the riser section is from 0.2 seconds to 5 seconds, and a residence time in the downer section is from 0.2 second to 2 seconds.

8. The process of claim 1, wherein a catalyst to hydrocarbon ratio in the riser section and downer section is from 10:1 to 30:1.

9. The process of claim 1, wherein a cut point of the lesser boiling point fraction and the greater boiling point fraction is from 250° C. to 400° C.

10. The process of claim 1, wherein the first cracking reaction product, the second cracking reaction product, or both, comprise at least one of ethylene, propene, butene, or pentene.

11. The process of claim 1, further comprising separating at least a portion of the second cracking reaction product from the catalyst such that a second cracking reaction product stream is passed out of the reactor system and the catalyst is passed to the regenerator.

* * * * *